United States Patent
Bajic

(10) Patent No.: US 10,538,868 B2
(45) Date of Patent: Jan. 21, 2020

(54) SEAT HEATER AND METHOD OF ITS FABRICATION

(71) Applicant: IGB Automotive Ltd., Windsor (CA)

(72) Inventor: Goran Bajic, Belle River (CA)

(73) Assignee: IGB Automotive Ltd., Windsor (CA)

( * ) Notice: Subject to any disclaimer, the term of this patent is extended or adjusted under 35 U.S.C. 154(b) by 578 days.

(21) Appl. No.: 15/208,681

(22) Filed: Jul. 13, 2016

(65) Prior Publication Data

US 2017/0071031 A1 Mar. 9, 2017

Related U.S. Application Data

(60) Provisional application No. 62/215,258, filed on Sep. 8, 2015.

(51) Int. Cl.
| | |
|---|---|
| *D05B 27/00* | (2006.01) |
| *H05B 3/34* | (2006.01) |
| *B60N 2/56* | (2006.01) |
| *B60N 2/58* | (2006.01) |
| *D05B 23/00* | (2006.01) |
| *D05B 35/00* | (2006.01) |

(52) U.S. Cl.
CPC ........... *D05B 27/00* (2013.01); *B60N 2/5685* (2013.01); *B60N 2/5891* (2013.01); *D05B 23/00* (2013.01); *D05B 35/00* (2013.01); *H05B 3/34* (2013.01); *D05D 2303/40* (2013.01); *H05B 2203/003* (2013.01); *H05B 2203/004* (2013.01); *H05B 2203/014* (2013.01); *H05B 2203/017* (2013.01); *H05B 2203/029* (2013.01)

(58) Field of Classification Search
CPC ................ H05B 3/34; H05B 2203/003; H05B 2203/004; H05B 2203/014; H05B 2203/017; H05B 2203/029
USPC ....... 219/211, 212, 217, 528, 529, 544, 545, 219/549
See application file for complete search history.

(56) References Cited

U.S. PATENT DOCUMENTS

| | | | | |
|---|---|---|---|---|
| 7,560,671 B2* | 7/2009 | Wheeler | ............ | A41D 31/0038 219/211 |
| 7,977,608 B2* | 7/2011 | Diemer | .................. | B60N 2/002 219/217 |
| 2003/0213797 A1* | 11/2003 | Yoneyama | ............... | H05B 3/34 219/543 |
| 2005/0061802 A1* | 3/2005 | Rock | ........................ | D04B 1/04 219/545 |
| 2012/0228903 A1* | 9/2012 | Abe | ........................ | A47C 7/74 297/180.12 |

* cited by examiner

*Primary Examiner* — Phuong T Nguyen
(74) *Attorney, Agent, or Firm* — Fildes & Outland, P.C.

(57) ABSTRACT

A seat heater includes a substrate. A formed heating wire is disposed on the substrate. A sewing thread attaches the formed heating wire to the substrate. A method of fabricating the seat heater includes forming a straight heating wire into a formed heating wire having miniature wave shape, feeding the formed heating wire onto a substrate, and attaching the formed heating wire onto the substrate by sewing a thread.

15 Claims, 4 Drawing Sheets

SEAT HEATER AND METHOD OF ITS FABRICATION

CROSS REFERENCE TO RELATED APPLICATION

This application claims the priority of U.S. Provisional Application No. 62/215,258 filed Sep. 8, 2015.

TECHNICAL FIELD

This invention relates to the field of comfort systems for occupant supports, and more particularly to seat heaters for vehicular and non-vehicular comfort systems, and a sewing machine and method for fabricating the seat heater.

BACKGROUND OF THE INVENTION

Seat heaters are utilized in mobile and stationary seating, furniture, and beds. Many seat heaters include a generally straight heating wire that is attached to a woven or non-woven fabric carrier or other pliable substrate material. In this class of heaters, the heating wire is retained on the textile surface by thread sewn back-and-forth over the wire such that the wire position and the wire sewing line ("route") is predetermined by a computer-controlled sewing apparatus. This technology allows sewing of the initially straight wire along a straight or curved route. The wire is fed onto the carrier along the predetermined route and held in the desired pattern by the sewing thread as it is sewn. However, in practice the minimum radius of the wire sewing line is about 5 mm and normally it is even larger, for example within 10-15 mm.

In one known heater design, the application of a wire that is preformed with miniature waves and a bend radius below 5 mm has been found advantageous. Such a wire shape allows for "packing" more wire length into the seat heater, which reduces the maximum wire temperature, allows for the use of cheaper alloys, and makes the seat heater more durable, especially if a seat in which the heater is installed is prone to create a crease in the heater. This type of heating wire may be referred to as a "formed," "preformed," or "processed" wire. In this heater design, the formed heating wire is laminated onto a substrate or in-between two layers of substrate by an adhesive or thermally activated adhesive.

In tests performed on a formed corrugated copper alloy wire with a 7 mm wave "magnitude," a 1 mm bending radius, and an 8 mm bending period, the formed wire lasted 2-10 times longer than the straight versions of the same wires. The straight wire is less durable and upon bending, it breaks, whereas a corrugated wire when bent tends to twist, making it more durable. However, so far no success has been reported in attaching such a corrugated wire by a sewing technology.

At least three reasons prevent conventional sewing technology from achieving a wire route replicating such advantageous tiny waves and sharp turns that formed wire provides. The first reason is that the wire stiffness and the tendency of the wire to retain its straightness makes the wire deviate from the desired route to the extent of being hit by the sewing needle. The second reason is that sharper curves require smaller sewing zig-zag pitch (a step between two subsequent hits by the needle), which slows down the sewing process. The third reason is that the wire metal strands may be deformed within their elasticity range and thus the wire continues over time to attempt to unbend and return to a straight disposition. This may cause a shift of the wire or the moving of the seat heater out of its position in a seat years after its installation.

SUMMARY OF THE INVENTION

The present invention provides a seat heater having a formed resistance wire sewn onto a substrate, and a method of making the seat heater. The present seat heater is more durable than known, conventional seat heaters.

More particularly, a seat heater in accordance with the invention includes a substrate, a formed heating wire including a wave shape disposed on the substrate, and a sewing thread attaching the formed heating wire to the substrate.

Optionally, the wave shape may be one of a sinusoidal shape, a rectangular wave shape, a saw-tooth shape, and a zig-zag shape. The formed heating wire may be formed into its shape prior to being disposed on the substrate. The substrate may be one of a woven fabric carrier and non-woven fabric carrier. The thread may be sewn in gaps between the half-periods of the wave shape of the formed heating wire. The thread may be sewn two or more times per each half-period of the wave shape of the formed heating wire. Alternatively, the thread may be sewn at less than all of the half-periods of the wave shape of the formed heating wire.

A method of fabricating a seat heater in accordance with the invention includes the steps of (a) forming a straight heating wire into a formed heating wire including a wave shape, (b) feeding the formed heating wire onto a substrate, and (c) attaching the formed wire onto the substrate by sewing a thread.

The thread may be sewn in gaps between half-periods of the wave shape of the formed heating wire. The thread may be sewn two or more times per each half-period of the wave shape of the formed heating wire. Alternatively, the thread may be sewn at less than all of the half-periods of the wave shape of the formed heating wire.

A sewing machine may be used to sew the thread according to a puncture pattern and a needle hit rate. The sewing machine may include a wire-forming unit that forms the wave shape of the formed wire from straight heating wire, prior to feeding and sewing the formed heating wire onto the substrate. The sewing machine also may include a wire-feeding conduit that feeds the formed heating wire onto the substrate. The sewing machine further may include a wire-forming unit, and a wire-forming rate of the wire-forming unit is synchronized with the needle hit rate of the sewing machine. One or more wire curvature sensors may be incorporated in the sewing machine to regulate the needle puncture pattern. Additionally, the needle punctures may be patterned within boundaries defined by curves outlining the wire wave pattern vertexes.

DETAILED DESCRIPTION OF THE INVENTION

Figure 1:
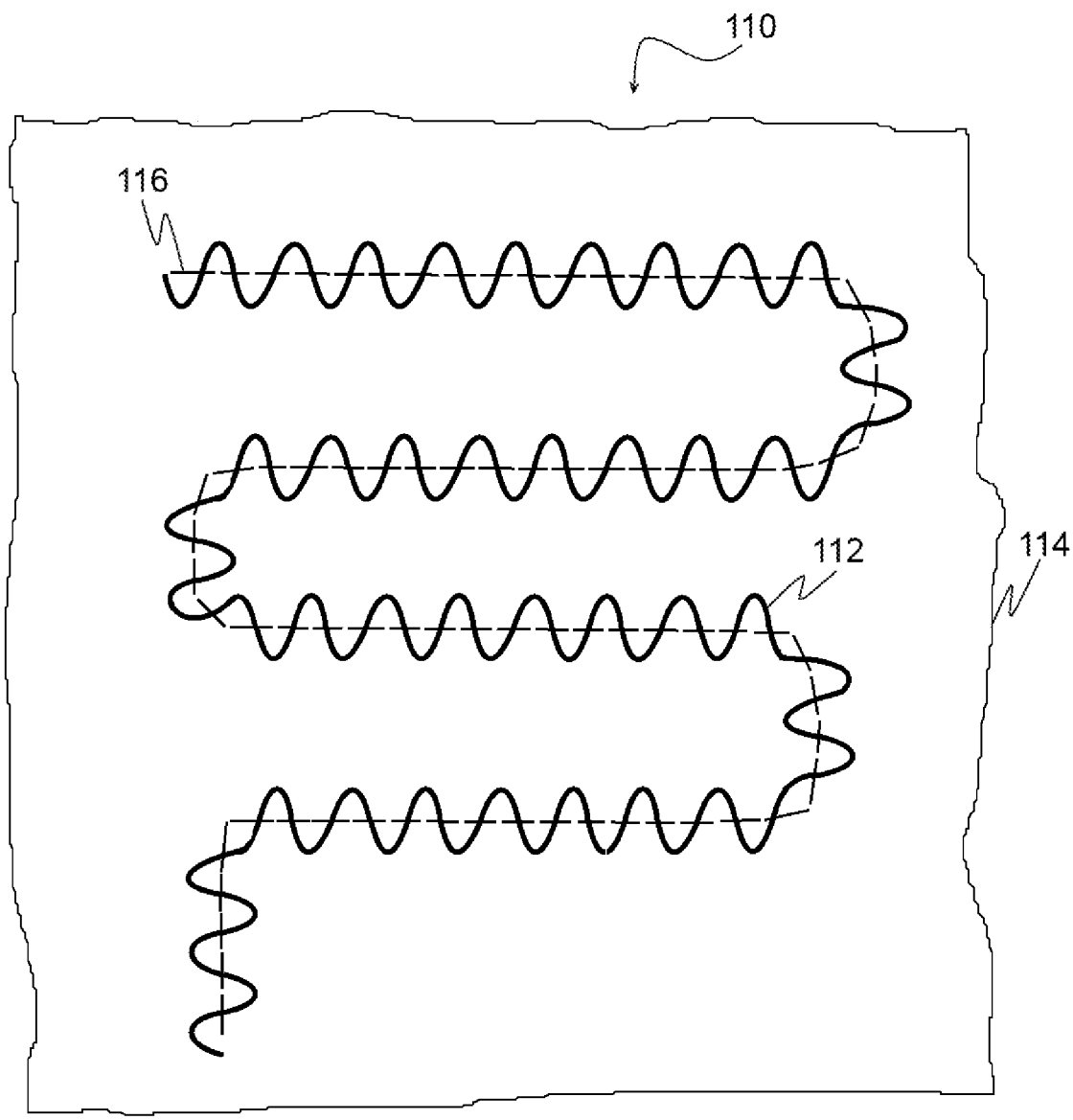
FIG. 1 is a plan view of a seat heater in accordance with the present invention.

Referring now to the drawings in detail, numeral 110 generally indicates a seat heater in accordance with the present invention. The seat heater 110 includes a formed heating wire sewn onto a substrate and is more durable than known, conventional seat heaters.

As shown in FIG. 1, the seat heater 110 includes a formed heating wire 112 disposed on a substrate 114. The formed heating wire 112 may be any type of electrical heating wire that is bent into a wavy or any other curved or periodic shape prior to the heating wire being disposed on the substrate 114. The preformed wire shape may be any wave or wave-like (wavy) shape, preferably periodic, including but not limited to a sinusoidal shape, a rectangular shape, a saw-tooth shape, a triangular shape, a zig-zag shape, or similar. For example, the wire may be formed into a miniature sine wave shape having a bend radius of less than 5 mm. The substrate 114 may be any suitable heater substrate material such as, but not limited to, a woven or non-woven fabric carrier or other pliable substrate material. The formed heating wire 112 is attached to the substrate 114 with a sewing thread 116 after the wire has been formed into its desired shape and disposed onto the substrate. The thread 116 is sewn in gaps between half-periods of the formed heating wire 112, such as gaps/open space between adjacent "waves," "vertexes," or "extremities" of the formed heating wire. The thread 116 passes through the substrate 114 once per each half-period of the formed heating wire 112, but the thread alternatively may pass through the substrate two or more times per each half-period of the formed heating wire or less than all of the half-periods of the formed heating wire as described in more detail below.

Figure 2:
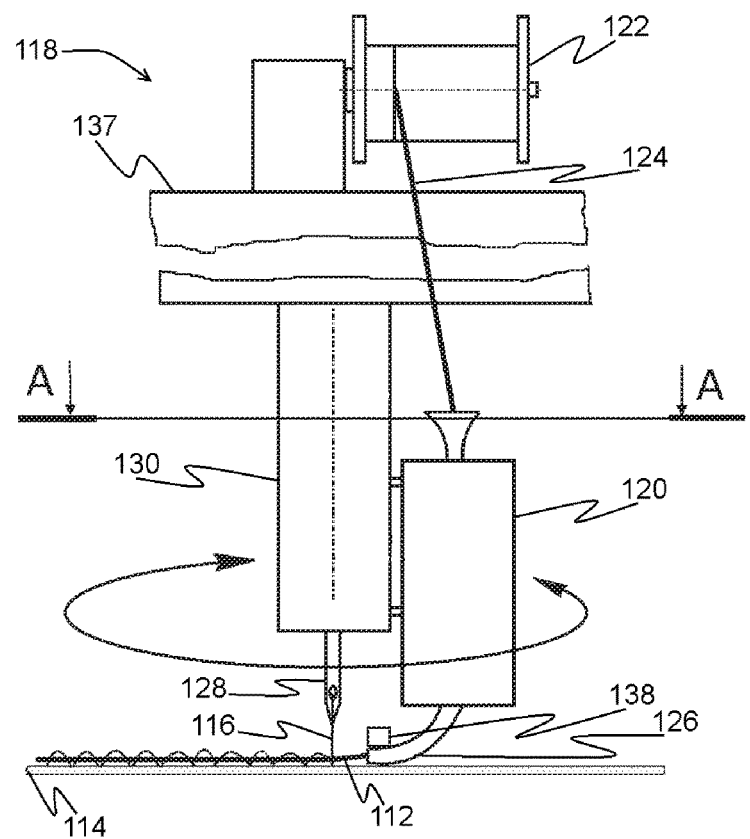
FIG. 2 is a side view of a sewing machine with a synchronized wire forming unit for fabricating the seat heater.
Figure 3:
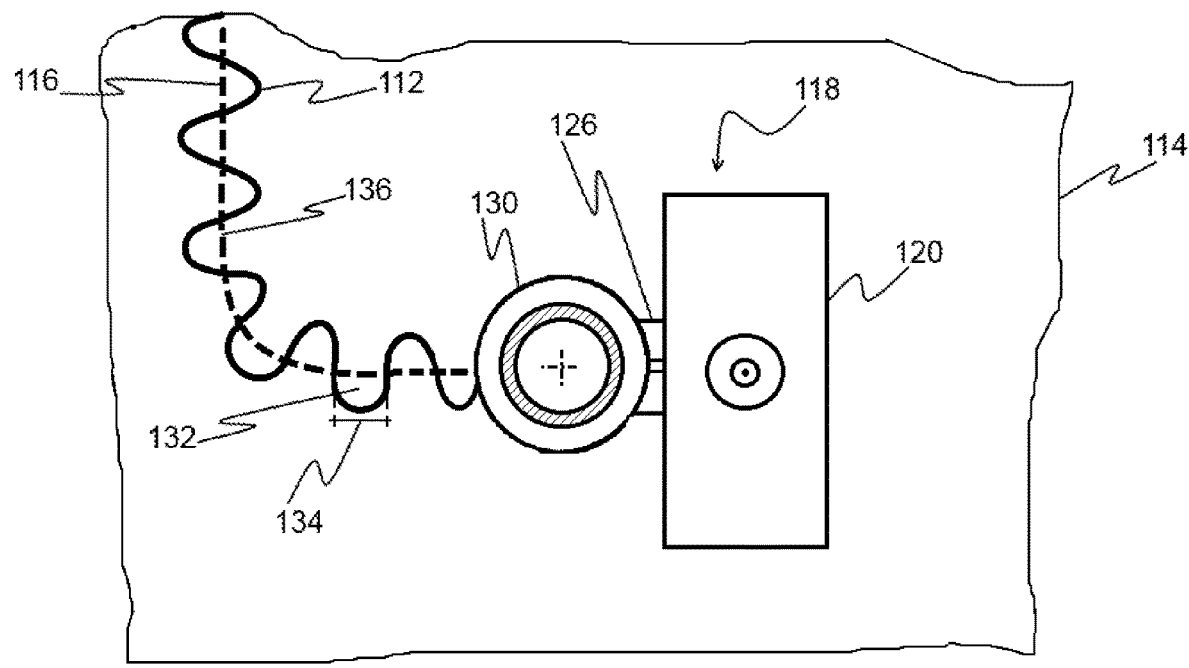
FIG. 3 is a cross-sectional view of the sewing machine taken along the line A-A in FIG. 2.

Turning to FIGS. 2 and 3, the seat heater may be made using a sewing machine 118 equipped with a wire forming unit 120 capable of forming a heating wire supplied from a spool 122 or other source of unprocessed, generally straight heating wire 124 (the wire may have a slight natural bend as a result of being wrapped on a spool, but is otherwise straight and free from any wavy or other periodic, bent shape when dispensed from the spool). The wire forming unit 120 may be, for example, a gear box that mainly draws the heating wire between two toothed wheels. A driver motor, for example a stepper-motor, geared stepper motor or similar, may be attached to the wire forming unit. Alternatively, a flexible shaft may be used to deliver mechanical power to the wire forming unit for processing the heating wire 124. In this case, the driver motor may be fixed on the sewing machine body. Alternatively, the wire forming unit may be driven by a mechanical gear linked to the driving mechanism of the sewing machine. In this case, no separate driver is required.

A wire feeding conduit 126 subsequently feeds the formed heating wire 112 onto the substrate 114 in front of a sewing needle 128 that sews the thread 116, thereby directing the just-processed (e.g., wavy or zig-zagged) wire into the sewing zone, which is an area in the path of the sewing needle. The wire feeding conduit 126 may be attached to a sewing head 130 of the machine that includes the needle 128. The conduit 126 may have an elongated (e.g., oval or rectangular) cross-section. After the formed heating wire 112 is dispensed onto the substrate 114, the sewing needle 128 then sews the sewing thread 116 in gaps 132 between half-periods 134 of the formed heating wire to attach the formed heating wire to the substrate.

In order to properly sew the thread 116 in the gaps 132, the needle hits 136 of the sewing machine 118 (puncture points at which the sewing needle 128 pierces through the substrate 114) should be synchronized with the wire waves of the formed heating wire 112. The forming rate of the wire forming unit 120 (i.e., waves, half-waves, or zig-zags produced or dispensed per unit time (e.g., per second)) may be mechanically or electronically synchronized with the sewing machine needle hit rate (i.e., the number of needle punctures 136 in the substrate 114 per unit time and/or the number of needle punctures per each half-period 134 of the wave pattern of the formed heating wire 112). The synchronization may be achieved by making the wire forming unit 120 part of the sewing machine 118. For example, the sewing machine head 130 may be rotatable and the wire forming unit 120 may be attached to the rotatable head.

Alternatively, the synchronization may be achieved by making the wire forming unit or a preformed wire dispensing reel attached to a stationary part 137 of the sewing machine rather than the rotatable head. In this alternative, the wire forming rate may be synchronized with the sewing machine needle hit rate using an adjustable delay feature. Also, in this alternative the wire feeding conduit must be flexible or articulated to couple the stationary wire forming unit (or preformed wire dispenser) with the movable (rotating/oscillating) sewing head.

One or more wire curvature sensors 138 may be located in the vicinity of the sewing head 130 to guard against the sewing needle 128 hitting the formed heating wire 112 dispensed from the wire feeding conduit 126. The needle puncture pattern of the sewing needle 128 may be regulated using the one or more wire curvature sensors 138.

Figure 4:
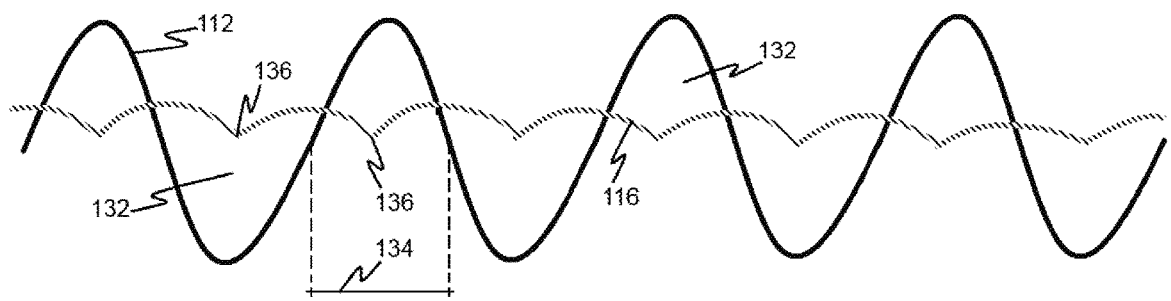
FIG. 4 is a schematic illustration of a formed heating wire and sewing thread pattern formed by the sewing machine, in which a sewing needle of the sewing machine punctures the heater substrate one time per each half-period of the wavy pattern of the formed heating wire.
Figure 5:
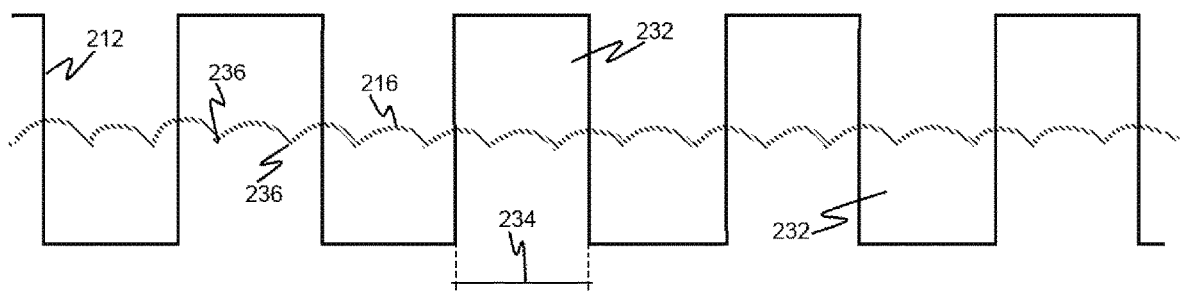
FIG. 5 is a schematic illustration of another formed heating wire and sewing thread pattern formed by the sewing machine, in which the sewing needle punctures the heater substrate two times per each half-period of the formed heating wire.
Figure 6:
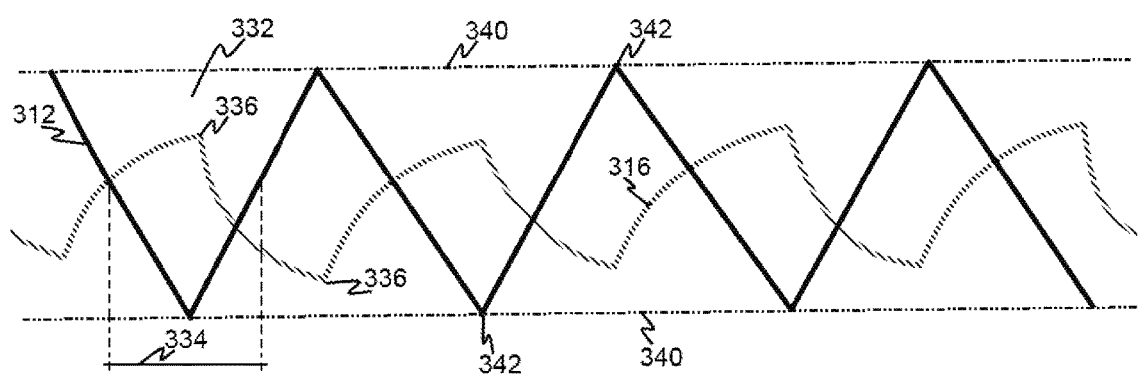
FIG. 6 is a schematic illustration of yet another formed heating wire and sewing thread pattern formed by the sewing machine, in which the sewing needle forms a zig-zag pattern from gap to gap in the wavy pattern of the formed heating wire.

As shown schematically in FIG. 4, the sewing needle of the sewing machine may puncture the heater substrate material at hit points 136 in the gaps 132 between portions of the wire wavy shape of the formed heating wire 112 once per each half-period 134 of the wave pattern. A needle hit may be defined as a point on the substrate where the sewing needle makes a stitch. The half-period 134 is half the length of a single periodic shape, i.e. half of one cycle of a wave of the formed heating wire. In this example, the formed heating wire 112 has been formed into a sinusoidal shape, and the sewing thread 116 passes through the substrate once every half of one complete cycle of the sinusoidal wave. Alternatively, as shown in FIG. 5 the sewing needle may puncture the substrate material in the gap 232 more than once per each half-period 234 (for example, but not limited to, 2 or more times per each half-period). In this example, the formed heating wire 212 has been formed into a periodic square-wave shape, and the sewing thread 216 passes through the substrate at hit points 236 twice every half of one complete cycle of the square wave (i.e., half-period). In these two examples, the needle puncture pattern (the pattern formed by the points at which the needle punctures the substrate) is generally centered between the vertexes of the periodic wave patterns. However, as shown in FIG. 6 the needle puncture pattern may be a zig-zag pattern in which the needle hits 336 alternate between opposite sides of an imaginary centerline that passes through the center of the periodic wave pattern of the formed heating wire 312. The zig-zag pattern can reduce the risk of the needle hitting the formed heating wire. However, the present needle puncture patterns differ from the prior art (straight wire sewing with zig-zag stitches) in that in the present invention the sewing needle punctures the substrate in points 336 that are in gaps 332 between half-periods 334 of the waves of the formed wire 312, and the needle and stitching formed by the thread 316 advance forward rather than crossing back-and-forth over the heating wire while also following the path of the heating wire. A gap 332 between half-periods is an area enclosed by the formed heating wire and an imaginary boundary outlining the formed wire wave pattern vertexes, as described in more detail below.

The needle hits 336 of the present invention are patterned within a "strip" having its boundaries defined by curves 340 that outline the wire wave pattern vertexes (peaks) 342. The curves 340 are the limits of the area in which the needle punctures the substrate and thereby define the needle puncture boundaries. The boundary outlines are schematically shown by example in FIG. 6, wherein the boundary outlines follow straight lines between adjacent peaks of the triangular wave pattern. Thus, the thread 316 is sewn entirely within the periodic shape of the formed heating wire 312. In contrast, in the prior art some of the needle punctures are outside of the boundaries of the peaks of a wavy pattern of the heating wire, as the needle and sewing thread follow a path back-and-forth along the heating wire.

Figure 7:
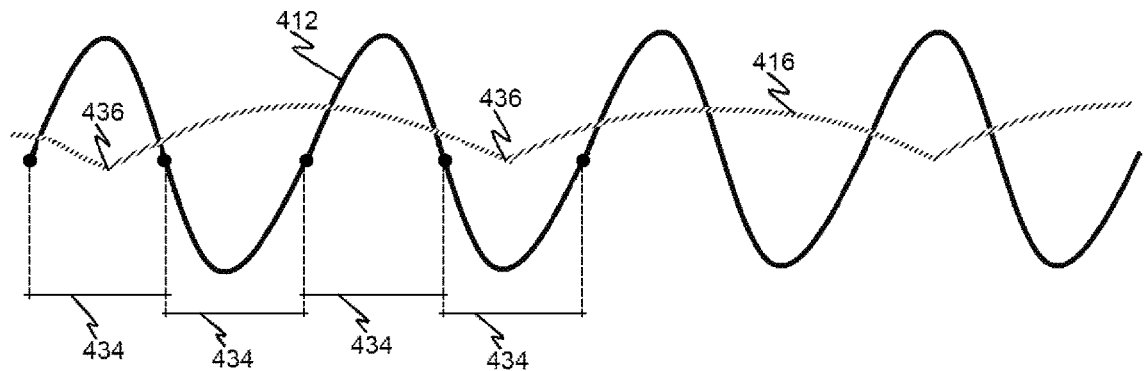
FIG. 7 is a schematic illustration of yet another formed heating wire and sewing thread pattern formed by the sewing machine, in which the sewing needle skips two half-periods of the formed heating wire wavy pattern between punctures through the substrate.
Figure 8:
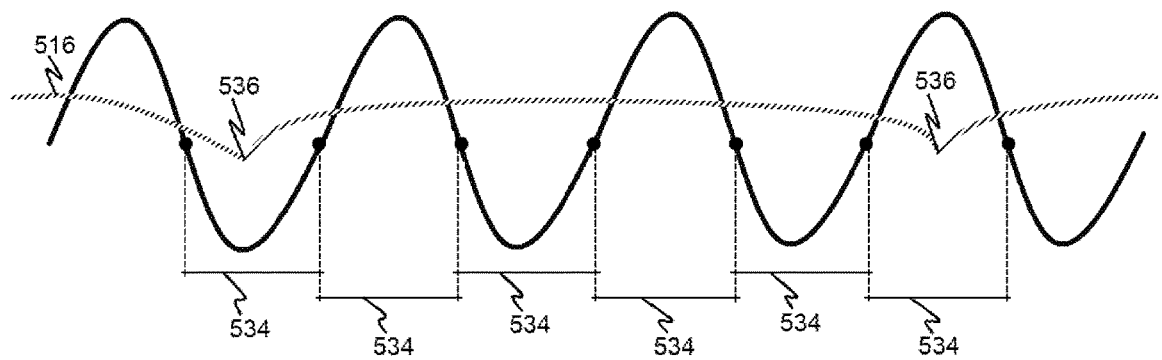
FIG. 8 is a schematic illustration of yet another formed heating wire and sewing thread pattern formed by the sewing machine, in which the sewing needle skips four half-periods of the formed heating wire wavy pattern between punctures through the substrate.
Figure 9:
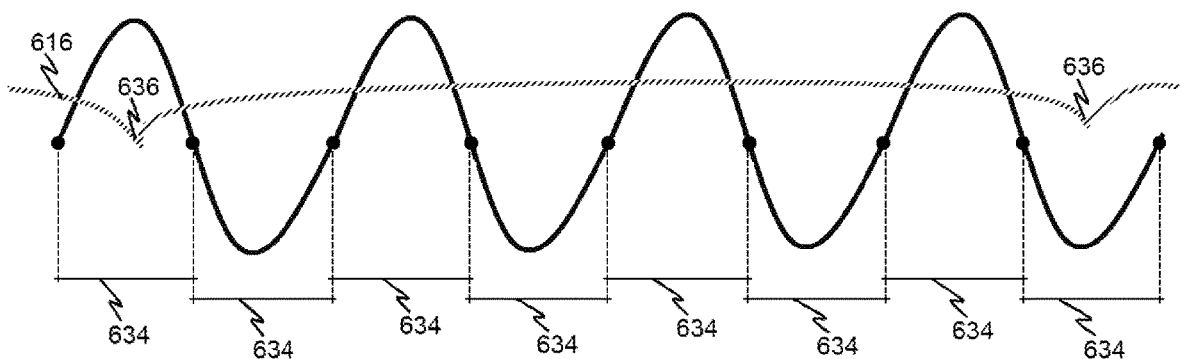
FIG. 9 is a schematic illustration of yet another formed heating wire and sewing thread pattern formed by the sewing machine, in which the sewing needle skips six half-periods of the formed heating wire wavy pattern between punctures through the substrate.

In yet another alternative, the needle hits may skip an even number of half-periods such that the thread is sewn at less than all of the half-periods of the wave shape of the formed heating wire. This results in the formed heating wire being unable to slip sideways from under the stitches made by the sewing thread. For example, as shown in FIG. 7 the needle skips two half-periods 434 of the periodic wave pattern between hits 436 through the substrate such that the sewing thread 416 is sewn at every third half-period of the formed heating wire 412. FIG. 8 similarly shows an example in which the needle pattern skips four half-periods 534 between hits 536 through the substrate (such that the thread 516 is sewn at every fifth half-period), and FIG. 9 shows an example in which the needle pattern skips six half-periods 634 between hits 636 through the substrate (such that the thread 616 is sewn at every seventh half-period).

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A seat heater comprising:
   a substrate;
   a formed heating wire including a wave shape disposed on the substrate; and
   a sewing thread attaching the formed heating wire to the substrate, wherein the thread is sewn in gaps between half-periods of the wave shape of the formed heating wire.

2. The seat heater of claim 1, wherein the thread is sewn two or more times per each half-period of the wave shape of the formed heating wire.

3. The seat heater of claim 1, wherein the thread is sewn at less than all of the half-periods of the wave shape of the formed heating wire.

4. The seat heater of claim 1, wherein the substrate is one selected from a group consisting of a woven fabric carrier and non-woven fabric carrier.

5. The seat heater of claim 1, wherein the wave shape is one selected from a group consisting of a sinusoidal shape, a rectangular square wave shape, a saw-tooth shape, and a zig-zag shape.

6. The seat heater of claim 1, wherein the formed heating wire is formed into its shape prior to being disposed on the substrate.

7. A method of fabricating a seat heater, the method comprising the steps of:
   forming a straight heating wire into a formed heating wire including a wave shape;
   feeding the formed heating wire onto a substrate; and
   attaching the formed heating wire onto the substrate by sewing a thread, wherein the thread is sewn in gaps between half-periods of the wave shape of the formed heating wire.

8. The method of claim 7, wherein the thread is sewn two or more times per each half-period of the wave shape of the formed heating wire.

9. The method of claim 7, wherein the thread is sewn at less than all of the half-periods of the wave shape of the formed heating wire.

10. The method of claim 7, wherein a sewing machine is used to sew the thread according to a needle puncture pattern and a needle hit rate.

11. The method of claim 10, wherein the sewing machine includes a wire-forming unit, and the wire-forming unit forms the heating wire into the wave shape prior to feeding and sewing the formed heating wire onto the substrate.

12. The method of claim 10, wherein the sewing machine includes a wire-feeding conduit, and the formed heating wire is fed onto the substrate via the wire-feeding conduit.

13. The method of claim 10, wherein the sewing machine includes a wire forming unit, and the wire-forming rate of the wire-forming unit is synchronized with the needle hit rate of the sewing machine.

14. The method of claim 10, wherein one or more wire curvature sensors are located on the sewing machine, and the needle puncture pattern is regulated using the one or more wire curvature sensors.

15. The method of claim 10, wherein the needle punctures are patterned within boundaries defined by curves outlining the wire wave pattern vertexes.

* * * * *